April 5, 1960    H. A. FERGUSON ET AL    2,931,252
PLANETARY TRANSMISSION ASSEMBLY
Filed March 8, 1956    3 Sheets-Sheet 1

INVENTORS.
Henry A. Ferguson
Jerrold A. Isaacson
Atty.

April 5, 1960   H. A. FERGUSON ET AL   2,931,252
PLANETARY TRANSMISSION ASSEMBLY
Filed March 8, 1956   3 Sheets-Sheet 2

INVENTORS
Henry A. Ferguson and
Jerrold A. Isaacson
Paul O. Pippel
Atty.

April 5, 1960  H. A. FERGUSON ET AL  2,931,252
PLANETARY TRANSMISSION ASSEMBLY
Filed March 8, 1956  3 Sheets-Sheet 3
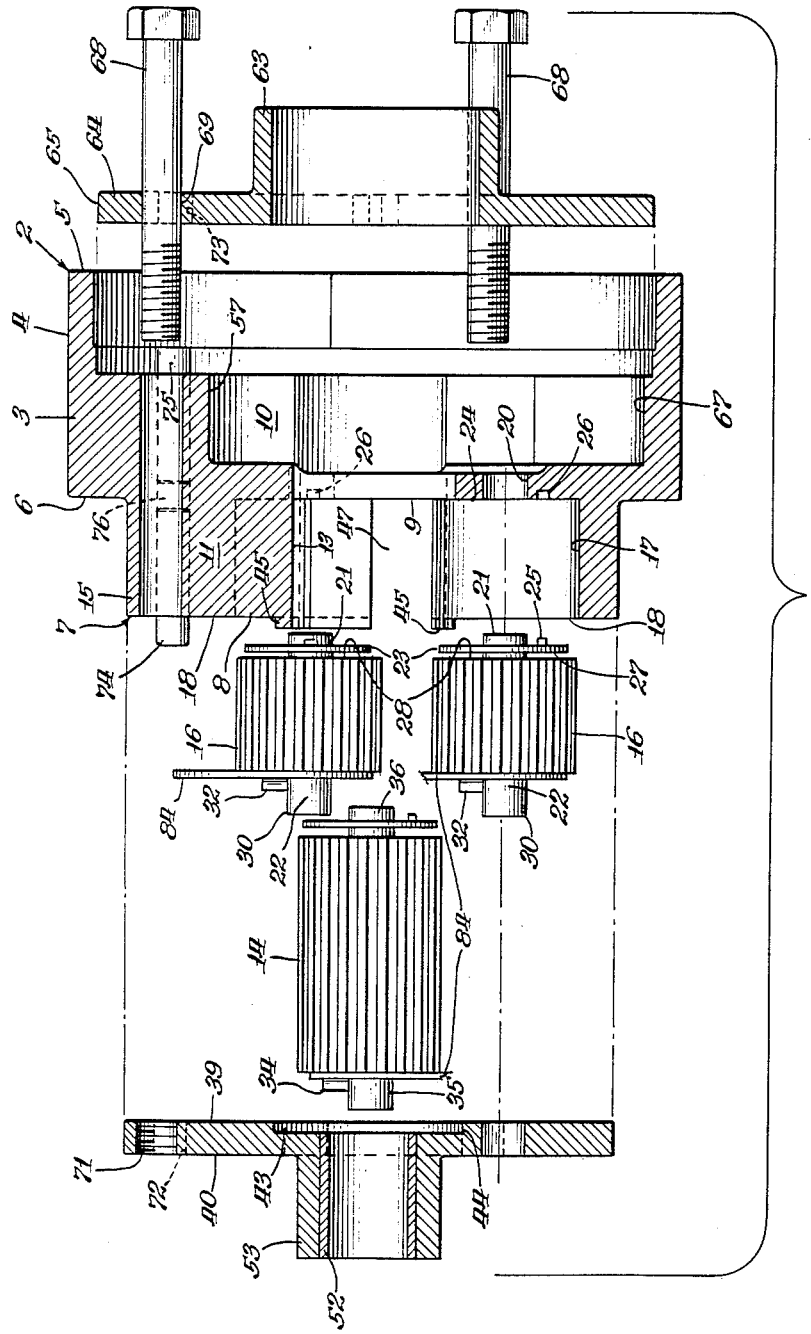
INVENTORS.
Henry A. Ferguson and
Jerrold A. Isaacson
Paul O. Pippel
Atty.

United States Patent Office 2,931,252
Patented Apr. 5, 1960

2,931,252

PLANETARY TRANSMISSION ASSEMBLY

Henry A. Ferguson and Jerrold A. Isaacson, Lombard, Ill., assignors to International Harvester Company, a corporation of New Jersey Application March 8, 1956, Serial No. 570,279

2 Claims. (Cl. 74—789)

This invention relates to transmissions and more specifically to a novel planetary transmission assembly shown and described in U.S. patent application Serial No. 573,382 for Tractor Transmission and Power Take-Off System filed March 23, 1956, in the names of Henry A. Ferguson et al.

The general object of the invention is to provide a novel transmission assembly which is economical to manufacture and wherein the parts are so arranged that they may be readily assembled on an assembly line and wherein there is no possibility of the parts being misassembled.

A more specific object of the invention is to provide a cage for a planetary transmission which incorporates a brake band and a planet carrier and wherein the carrier and band are integrated into a unitary self-sustaining structure.

These and other objects of the invention will become more apparent from the specification and the drawings wherein:

Figure 6 is an exploded view of the structure shown in Figure 5 with the sun gears removed in order to clarify the structure.

Figure 1:
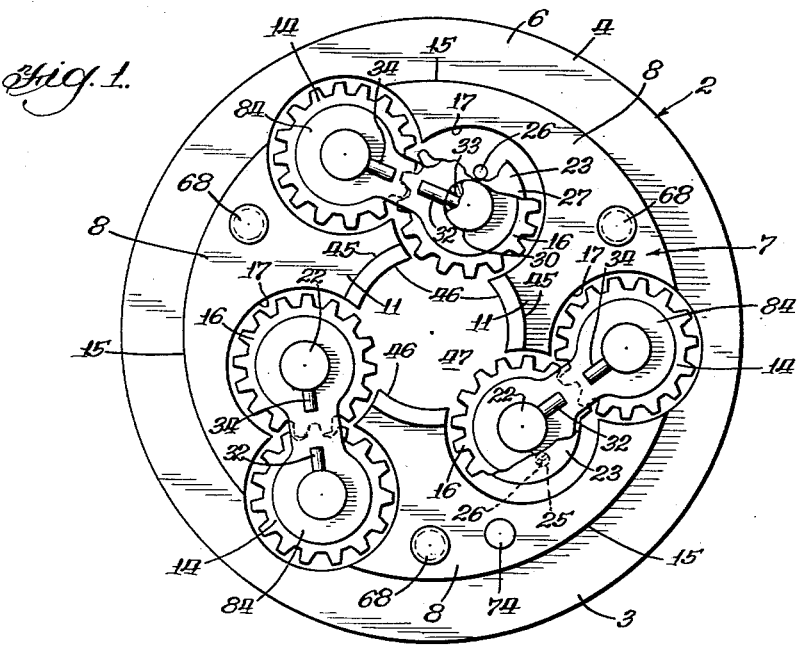
Figure 1 is a rear view of the assembly with the rear cover removed and some of the parts broken away in order to more clearly illustrate the assembly.
Figure 2:
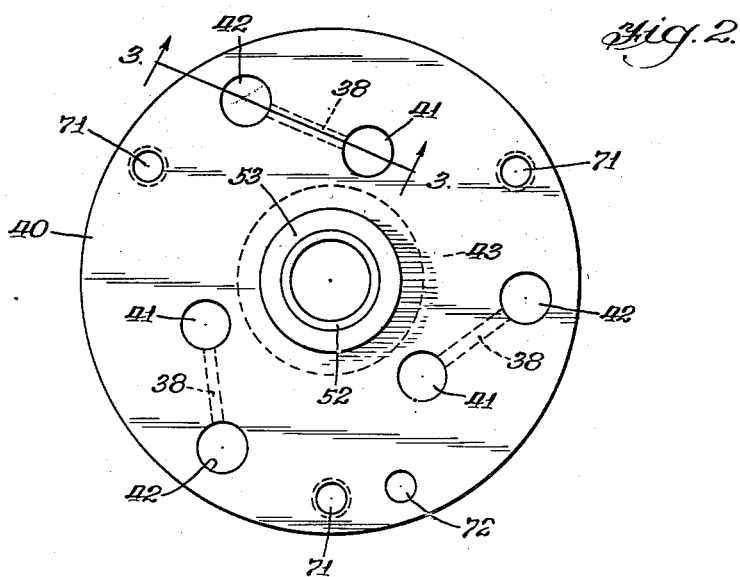
Figure 2 is a rear view of the rear cover plate.
Figure 3:
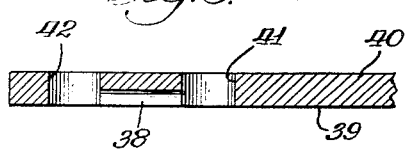
Figure 3 is a fragmentary enlarged sectional view of the rear cover plate taken substantially on the line 3—3 of Figure 2.

Describing the invention in detail, the assembly generally indicated 2 comprises a body 3 which includes a brake annulus or ring 4 of substantial axial width, the ring having forward and rear edges 5 and 6 and surrounding a carrier or cage generally designated 7.

Figure 4:
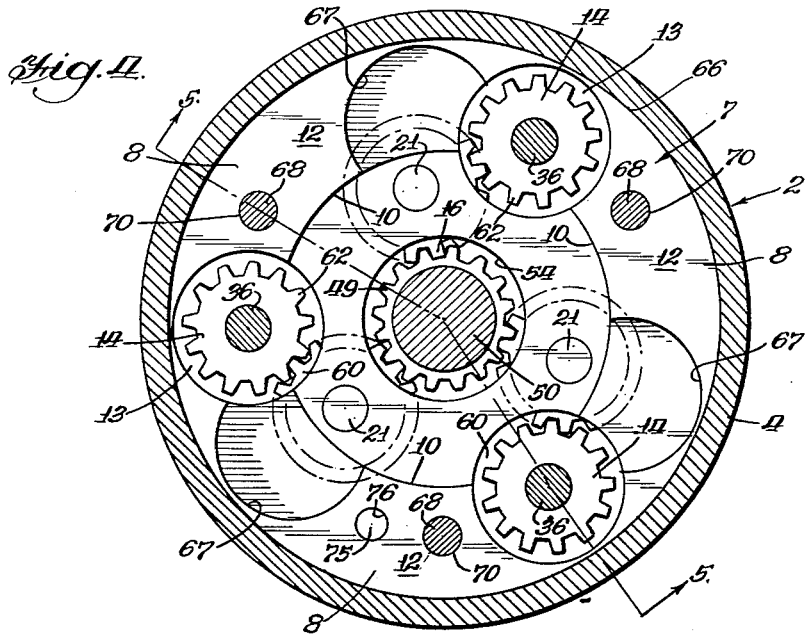
Figure 4 is a sectional view taken substantially on the line 4—4 of Figure 5.
Figure 5:
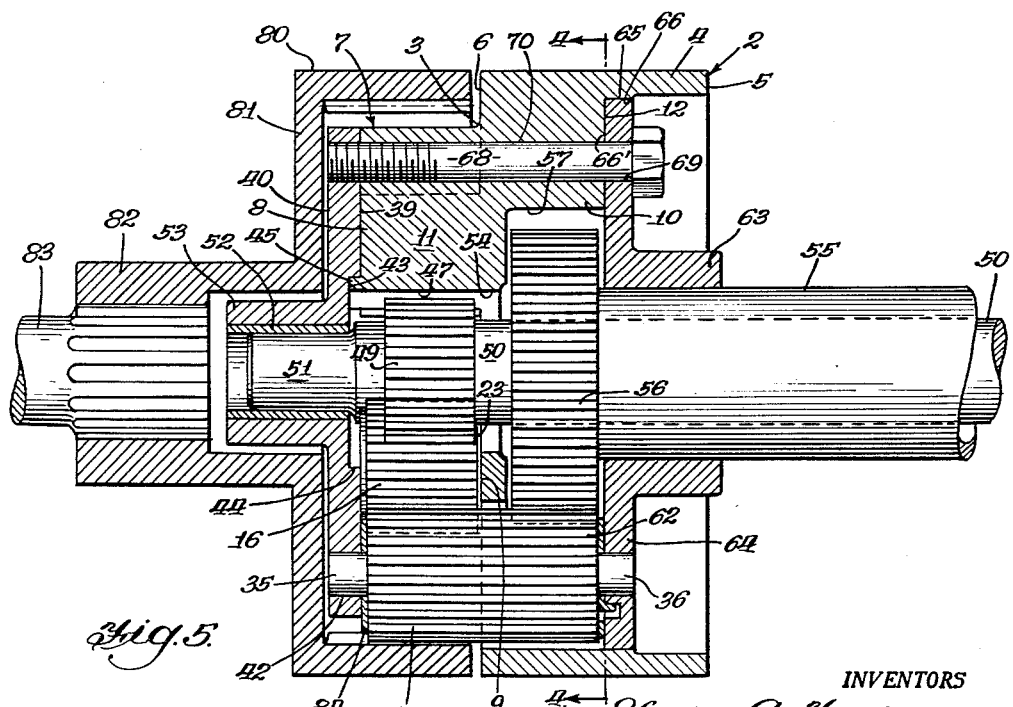
Figure 5 is a longitudinal sectional view taken substantially on the line 5—5 of Figure 4.

The carrier in the present instance comprises three identical circumferentially spaced segments or portions 8 formed integral with an intermediate radial web 9 (Figure 6). The segments 8 are divided by the web into forward and rear end portions or extremities 10 and 11 respectively, the forward portions 10 projecting into the ring and merged therewith and terminating in forward coplanar abutment faces 12 intermediate the edges 5 and 6 of the ring. Openings or receptacles 13 (Figures 4 and 6) are cored between adjacent edges of the segments 8 and extend from front to rear thereof and accommodate the double planet pinions 14 therein, the spaces 13 being open radially outwardly through which extend the pinions 14 beyond the outer periphery of the carrier as defined by the circumferential edges 15 (Figure 1) of the rear portions 10 of sections 8.

The pinions 14 mesh with single planet pinions 16 which are entered in cored openings 17 in the portions 10 of sections 8, the openings 17 being open through the rear ends 18 of the portions 10 and closed at their forward ends by the wall 9 which is provided with cavities or holes 20 (Figure 6) supporting the forward ends 21 of the single pinion mounting shafts 22 on each of which is sleeved a thrust washer 23 which bears as at 24 against the wall 9 and is provided with an axial lug 25 which enters into a depression 26 in wall 9 for holding the washer against rotation. Each washer has a thrust face 27 which is adapted to engage an opposing face end 28 of the related pinion 16.

The rear end 30 of each shaft 22 is provided with a transaxial pin 32 press-fitted into an aperture 33 (Figure 1) in the shaft and extending outwardly from one side thereof.

It will be seen from a consideration of Figure 1 that each pin 32 is directed toward and axially aligns with a similar pin 34 press-fitted into the rear end 35 (Figure 6) of the double pinion mounting shaft 36 which supports the meshing dual pinion 14. Each pair of pins 32, 34 enters transaxially into a common slot 38 formed in the forward face 39 of a back cover plate 40 and the rear ends 30, 35 of the shafts 22, 36 are supported in apertures 41 and 42 respectively in the rear cover plate 40. The pins 32, 34 and cooperating side edges of the slots 38 prevent rotation of the shafts 22, 36 and endwise displacement thereof.

The plate 40 has an annular central recess 43 on its forward side circumscribed by a shoulder 44 which snugly fits over pilot flanges 45 extending axially outwardly of the rear end faces 18 (Figure 6) of portions 10. The flanges 45 are disposed about the inner peripheries 46 (Figure 1) of the portions 10 which define an opening or rear sun gear well 47 into which the inner sides of pinions 16 extend and therein mesh with a rear sun gear 49 which is connected to an input shaft 50 which has a pilot end journal portion 51 entered into a bushing 52 in a hub 53 which is formed integral with plate 40 and extending rearwardly therefrom. The center input shaft 50 extends forwardly from gear 49 through a central aperture 54 in the wall 9 and through a hollow sleeve shaft 55 which has an integral front sun gear 56 disposed ahead of web 9 in a well 57 defined by and between the forward portions 10 of the sections 8. The forward portions 10 are separated circumferentially and define spaces 60 (Figure 4) through which the inner sides 62 of the double pinions extend and mesh with the front sun gear 56.

The shafts 50 and 55 project forwardly through a central hub 63 on a front cover element 64 which fits complementally at its periphery 65 into an annulus 66 formed on the interior of the brake ring intermediate its ends. The cover plate 64 is annular and has a flat back side 66' seated against the forward surfaces 12. The forward portions 10 may be cored away to provide voids or cavities 67 (Figure 4) to lighten the structure.

The front and rear covers are held together in assembly with the body portion by three bolts 68 which extend through apertures 69 in the front cover, through openings 70 in the respective portions 8 and thread into openings 71 in the rear cover.

The front and rear covers are also provided with guide openings 72 and 73 (Figure 6) which fit over pins 74 and 75 which are press-fitted into an aperture 76 in one of the portions 8 and project from the front and rear ends of the portion.

The above described unit fits into a ring gear 80 with its carrier portion, the double gears meshing with the ring gear which is connected to a carrier plate 81 which has a hub 82 splined to an output shaft 83.

Each pair of shafts 22 and 36 is spanned at its rear ends 30 and 35 by a common thrust washer or spanner member 84 which has openings at opposite extremities receiving the said rear ends of the shafts and disposed between the rear ends of the pinions and the pins 32 and 34.

What is claimed is:

1. An assembly fool-proof planetary transmission comprising a cage having a plurality of axially extending pinion-receiving apertures therethrough, an annulus formed at one end of said cage, a closure plate member closing said one end of the cage and adjacent ends of said apertures and complementally fitting into said annulus, a cover plate member complemental to and having an inner side seated against the opposite end of the cage and closing the adjacent ends of said apertures, first pinions in said apertures and having lengths extending from adjacent one member to adjacent the other member, a shaft supporting each pinion and having a length greater than the spacing between said members and having ends fitting in openings in respective members, said cage having a radial wall intermediate its ends and pinion cavities shorter than said apertures and extending between said wall and cover member, second pinions of a length corresponding to said cavities mounted therein, said cavities being disposed one adjacent to each aperture and said cage having radial passages between each aperture and companion cavity, the pinions in each aperture and adjacent cavity projecting into the related passage and meshing with each other, a shaft element mounting each second pinion and having one end projecting into a cavity in said intermediate wall and having an opposite end projecting into a hole in the cover member, a pin extending radially from the end of each element and shaft adjacent to said cover member and opposing the adjacent pinion at one side and projecting into a recess in the cover member on the other side, and a spanner between each shaft and adjacent element sleeved thereover and disposed between the related pinions and pins.

2. The invention according to claim 1, and said cage having front and rear central cavities, said front cavity being larger than the rear, and coaxially arranged small sun gear in the rear cavity meshing with the second pinions through passageways in said cage, and a large sun gear in the front cavity meshing with the first pinions in an area between said intermediate wall and said plate member.

References Cited in the file of this patent

UNITED STATES PATENTS

| Re. 5,758 | Bly | Feb. 10, 1874 |
| 489,112 | Wright | Jan. 3, 1893 |
| 1,647,621 | Hawley | Nov. 1, 1927 |
| 1,819,606 | Jones | Aug. 18, 1931 |
| 2,319,254 | Neuhouse | May 18, 1943 |
| 2,482,313 | Bascale | Sept. 20, 1949 |
| 2,560,886 | Orr | July 17, 1951 |